March 2, 1943.  R. R. CURTIS  2,312,525
PUMP CONSTRUCTION
Filed Sept. 5, 1941  2 Sheets-Sheet 1
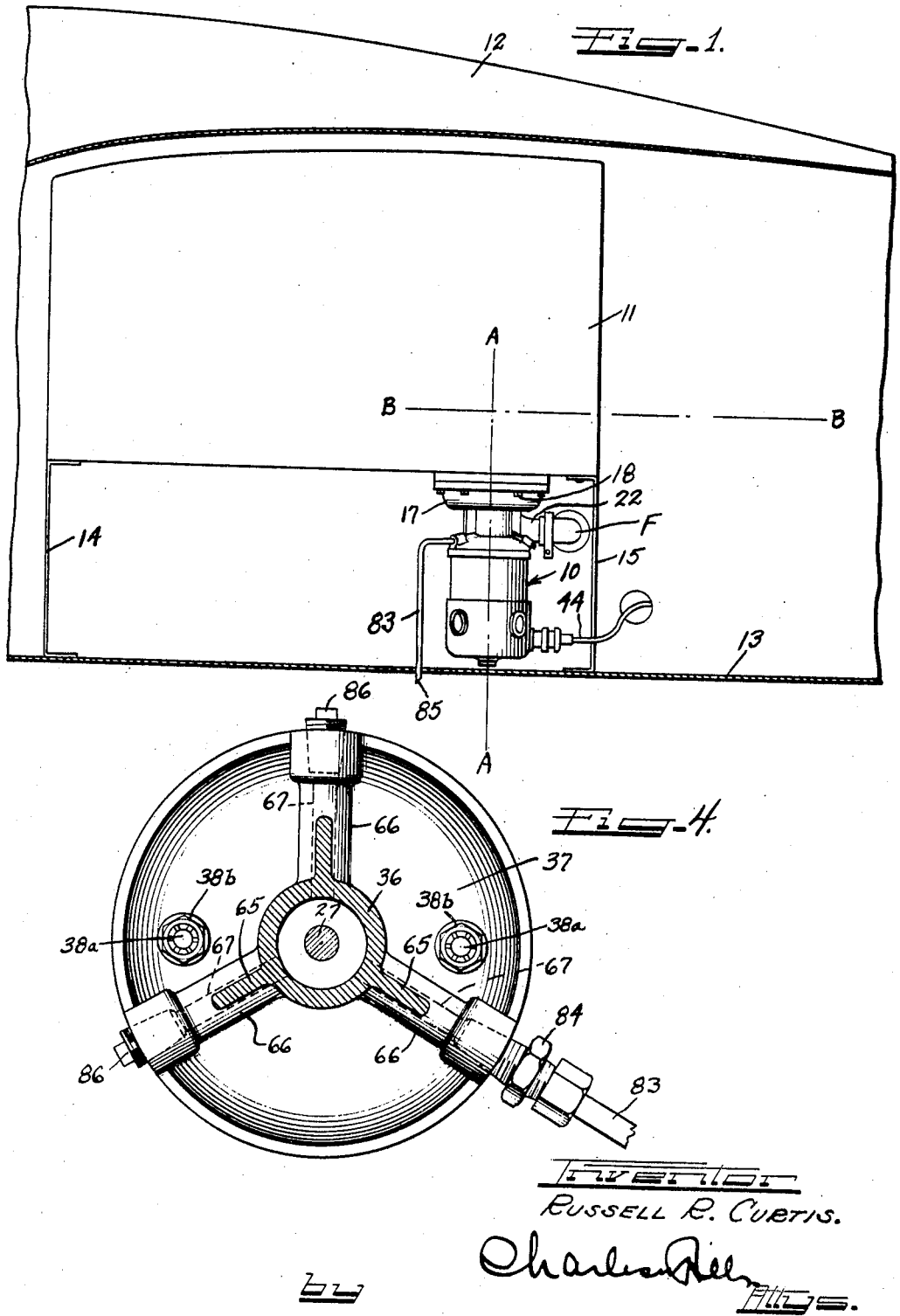
Inventor
RUSSELL R. CURTIS.

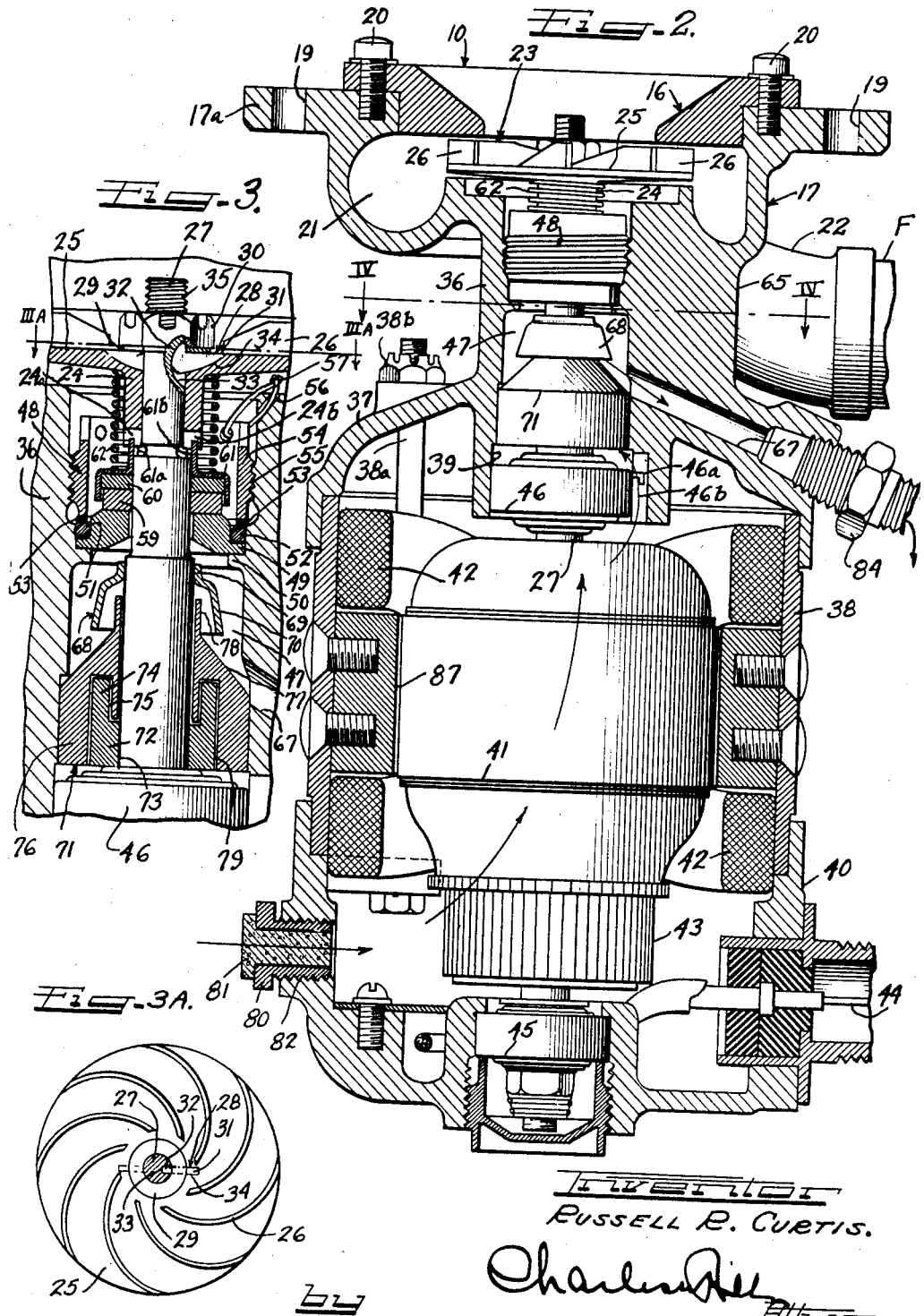
March 2, 1943.　　　R. R. CURTIS　　　2,312,525
PUMP CONSTRUCTION
Filed Sept. 5, 1941　　　2 Sheets-Sheet 2
Inventor
RUSSELL R. CURTIS Patented Mar. 2, 1943

2,312,525

UNITED STATES PATENT OFFICE 2,312,525

PUMP CONSTRUCTION

Russell R. Curtis, Dayton, Ohio, assignor to Curtis Pump Company, Dayton, Ohio, a corporation of Ohio Application September 5, 1941, Serial No. 409,644

15 Claims. (Cl. 103—87)

The present invention relates to a fuel system and more particularly to a booster pump construction for an aircraft fuel system.

The pump portion of the assembly of this invention is of the type disclosed in my copending application entitled "Booster pump for aircraft fuel systems," Serial No. 352,064, filed August 10, 1940.

It is customary in all fuel systems of the force feed type to provide at least one power driven pump to assure the proper delivery of fuel to an engine. In aircraft fuel systems, a plurality of such pumps are usually provided in the delivery line from the fuel tank to the engine. The pumps are so sequentially arranged that the discharge of one pump assures adequate delivery of fuel to the suction side of the next pump.

Furthermore, this arrangement of pumps must be such as to maintain adequate delivery of fuel under a wide variety of operating conditions such as experienced in operating aircraft at various altitudes with the resultant changes in temperature and pressure. Under certain conditions, less than or all of the pumps may be required in operation. Consequently, each pump must be so independently driven that its operation is controlled by the pilot. One fuel pump is therefore usually driven by the aircraft engine for delivering fuel to the engine under all normal conditions. Additional pumps are either hand driven or separately power driven at the pilot's discretion. This assures proper fuel delivery under abnormal flying conditions at very high altitudes or during emergencies when one or more of the other pumps partially or completely fail to operate.

Generally, the present invention provides a centrifugal booster or auxiliary pump of the type which separates gas from a gas-liquid fuel mixture and delivers fully liquid fuel under pressure to the delivery line of the fuel system. Motive power, separate from the aircraft engine, such as an electric motor, is provided for driving the booster pump and its operation is controlled as desired usually by a switch between the pump and a source of electrical energy.

A centrifugal pump is preferably used, as it provides a by-pass through the impeller when not in operation.

The assembly of such a pump and a driving member therefor, such as an electric motor, requires the provision of sealing means therebetween along the drive shaft for preventing leakage of liquids from the pump portion to the motor portion and also a barrier construction or preventing propagation of flame from the motor portion to the pump portion.

It is also highly desirable to provide an air-circulating system for cooling the motor and for continuously scavenging the motor, the flame barrier construction, the seal construction and the shaft bearing adjacent thereto.

It is therefore an object of the present invention to provide an auxiliary pump for a fuel system which is effectively sealed from its prime mover.

Another object o fthe present invention is to provide a vapor-scavenged, air-cooled power driven auxiliary pump unit for a fuel system which is small, compact, and easily interposed in the delivery line of the system.

A further object of the present invention is the provision of a driven booster pump unit for aircraft fuel systems which may be mounted directly on a fuel tank at any position below the hydraulic gradient of the fuel.

A still further object of the present invention is the provision of an electric motor driven booster pump unit for aircraft fuel systems which is effectively sealed against fuel leakage from the pump portion to the electric motor portion and is further sealed against flame or spark propagation from the electric motor to the pump portion.

Another and still further object of the present invention is the provision of a slip stream actuated vapor scavenging and air-cooling system for the driving motor of an auxiliary or booster pump.

A still further object of the present invention is the provision of an electrically driven auxiliary booster pump for aircraft fuel systems which is flame and explosion proof.

The novel features believed to be characteristic of the present invention are set forth with particularity in the appended claims. The invention itself, however, both as to its organization and manner of construction, together with further objects and advantages thereof, may best be understood by reference to the following description taken in connection with the accompanying drawings, in which:

Figure 1 is a fragmentary view in vertical cross-section, with parts in elevation, of an airplane wing and wing mounted fuel tank illustrating the manner in which the booster pump unit of this invention is connected to the fuel tank and the manner in which a tube or pipe extends from the unit into the slip stream of the airplane for actuating the pump motor vapor-scavenging and air-cooling system;

Figure 2 is an enlarged longitudinal cross-sectional view, with parts in elevation, of the pump construction illustrated in Figure 1;

Figure 3 is a fragmentary and enlarged longitudinal cross-sectional view of a portion of Figure 2, with parts in elevation, illustrating details of construction between the pump and motor portions of the unit of this invention;

Figure 3a is a horizontal cross-sectional view along the line IIIa—IIIa of Figure 3; and, Figure 4 is a reduced transverse cross-sectional view, with parts in elevation, of the pump construction as seen when viewed in the plane taken substantially along the line IV—IV of Figure 2.

As best shown in Figure 1, a pump assembly 10, including a prime mover therefor, is illustrated as being directly connected to a fuel tank 11 and depending perpendicularly from the flat bottom wall thereof, along the axis line A—A. The unit 10 is supported within an aircraft wing 12 in spaced relation from the lower edge 13 thereof. Brackets 14 and 15 support the tank 11 above the lower wing edge 13.

It is to be understood, of course, that although the pump assembly 10 of the present invention is illustrated as forming a portion of an aircraft fuel system, the device is adapted for use with any vehicle in which liquid fuel is delivered from a fuel tank to a prime mover for the vehicle. It is to be further understood that the pump assembly 10 may be, if desired, connected perpendicularly to a side wall of the tank along an axis such as B—B in Figure 1. While a perpendicular mounting of the pump on the tank wall along the axis A—A is preferred, the pump will operate satisfactorily in any angular position, between the axes A—A and B—B. However, the most efficient mounting of the pump assembly 10 is in depending vertical relation along the axis line A—A as shown in order that the pump be positioned as far as possible below the hydraulic gradient of the fuel tank and freely receive fuel from the tank.

Of course, when the tank fills the space between the top and bottom surfaces of the wing side mounting along the axis B—B is used. This connection introduces the undesirable feature of maintaining the hydraulic gradient above the pump throat, so that the tank can never be drained as completely as when the pump depends from the bottom wall thereof.

The pump and prime mover assembly is best illustrated in Figure 2. The pump construction is preferably of the centrifugal booster type such as disclosed in my copending application entitled "Booster pump for aircraft fuel system," Serial No. 352,064, filed August 10, 1940. This construction provides a tapered throat member or ring 16 mounted in the fuel tank outlet and maintained therein by the pump casing 17 being connected to a wall of the fuel tank by means of studs or bolts 18 which pass through openings 19 in an outturned casing flange 17a. The throat 16 is connected to the casing 17 by means of screws 20.

The casing 17 defines an internal volute chamber 21 communicating around the inner periphery thereof with the throat inlet and opening on the outer periphery thereof into a discharge member 22 which in turn is connected to a fuel delivery line F.

The pump has an impeller 23 mounted under the throat ring 16 and spanning the throat inlet with its outer periphery communicating freely with the volute chamber 21. The impeller 23 comprises a hub 24, a flat disc flange 25, and a series of radially curved vanes 26 projecting from the flange 25 toward the throat ring 16 (Figures 2 and 3a). The impeller is secured to a driving shaft 27 by a key 28, a washer 29, and a nut 30 threaded on the shaft 27.

As best shown in Figures 3 and 3a, the key 28 is L-shaped and has one leg 31 longer than the opposite leg 32. The shaft 27 is provided with a longitudinally extending partially circular keyway 33, such as used with Woodruff keys, in registry with a radially extending segmental circular keyway 34 in the top face of the impeller flange 25. The key leg 31 is curved to complementally seat within the keyway 34, while the key leg 32 is curved to seat within a portion of the curved keyway 33. It is to be noted that when the key 28 is seated within the keyways 33 and 34, the leg 32 extends upwardly beyond the top surface of the impeller flange 25. This extending portion of the key leg 32 is seated in the shaft keyway 33 and extends into the aperture of the washer 29 and may or may not extend above the washer. When the nut 30 is threaded to the externally threaded portion 35 of the shaft 27, the washer 29 surrounds the shaft and key leg 32 and seats against the key leg 31 to tightly maintain the key within the keyways whereby the impeller is locked to the shaft.

The circularly cut keyway 34 in the flange 25 is conveniently cut with a milling cutter and the leg 32 of the key, by being seated in the washer 29, is held against radial displacement out of the thus cut slot. The key 28 is so shaped as to readily permit its entry after the impeller has been assembled on the shaft. This is effected by rocking the key into the aligned keyways to the position shown and then tightening the nut against the washer as previously described. The heretofore required press fitting of a rectangular Woodruff key in a slot formed longitudinally in the shaft 27 before mounting the impeller on the shaft is thus avoided.

The housing 17 has a hollow intermediate restricted portion 36 defining a shaft well and which terminates in a flared portion 37 forming the head of a prime mover housing 38. The shaft housing portion 36 is extended into the flared portion 37 to form a bearing housing 39.

An end cap 40 closes the other end of the motor housing 38. The head 37 and end cap 40 are preferably bored at their ends to slidably fit onto the ends of the housing 38 and the housing is clamped therebetween by interior draw bolt and exterior nut assemblies such as 38a and 38b respectively.

The prime mover is preferably an electric motor comprising an armature 41, spaced field coils 42 connected to the housing 38, a commutator 43, and a conductor 44 to the commutator brushes (not shown) by which the prime mover is energized from a source of electrical energy (not shown).

The pump shaft 27 extends through the electric motor and is supported in the end cap 40 by means of an anti-friction bearing 45. The shaft 27 is also supported in the casing portion 39 by an anti-friction bearing 46. A lug 46a on the bearing seats within a slot 46b in the casing 39 to hold the outer race of the bearing against rotation.

The well 47, defined by the shaft housing portion 36, includes at one end thereof a liquid seal construction 48 for sealing the pump and motor portions against liquid leakage therebetween.

In the details of construction best shown in

Figure 3, the seal construction 48 comprises a metal ring 49 loosely embracing the shaft 27 and seated on an inwardly extending shoulder 50 formed on the inner periphery of the casing portion 36 intermediate its ends. The marginal edges at the periphery of the ring member 49 are of reduced thickness to define a slot 51 between the body of the ring and the inner periphery of the casing 36. A resilient ring member 52 is seated in the slot 51. A ring washer 53 is seated on the resilient ring member 52 and is urged thereagainst by a tubular seal nut 54.

The seal nut 54 is externally threaded as at 55 for engaging internal threads in the casing 36. When the seal nut 54 is threaded toward the shoulder 50, the washer 53 expands the resilient washer 52 in a radial direction to tightly seal the slot 51. This seal construction seals the well portions on opposite sides of the shoulder 50 around the inner periphery of the casing 36.

An angularly extending bore 56 is formed through the corner at the pump end of the housing 36 for receiving therethrough a locking wire 57. Circumferentially spaced apertures 58 are provided radially through the free end of the seal nut 54. When the seal nut 54 has been threaded to its proper position, the aperture 58 nearest the bore 56 receives therethrough the locking wire 57, the ends of which are twisted together to form a closed loop.

A compressed graphitic carbon seal ring 59 slidably embraces the shaft 27 for movement axially along the shaft. The carbon ring 59 and the metal seal ring 49 are mounted in sliding face engagement. The carbon ring 59 is covered with a resilient cushion washer or member 60 preferably formed of fuel and oil resisting artificial rubber such as Neoprene. The cushion washer snugly engages the shaft 27 in sealing relation therewith. A cup member 61 has a reduced neck end slidably surrounding the shaft 27 and an enlarged skirted end surrounding the cushion member 60. Axially extending tangs or fingers 61a and 61b on the reduced end of the cup member 61 engage within slots 24a and 24b in the impeller hub 24 to form a positive drive connection with the impeller. A coil spring 62 is interposed between the cup member 61 and the impeller flange 25, so that a constant force is exerted on the resilient cushion 60 for maintaining the carbon ring 59 tightly against the metal seal ring 49. At the same time the urging of the cup by the spring serves to squeeze the resilient ring 60 in the skirted portion of the cup to insure rotation of the ring 60 with the cup, and the ring 60 in turn drives the carbon ring to effect sliding face engagement with the metal ring 49.

This construction provides a seal around the shaft dividing the well 47 into two isolated chambers.

These two chambers in the well are thereby effectively sealed against excessive liquid leakage therebetween.

It is preferred that graphitic carbon be used in the rotating seal ring 59, as it provides satisfactory wear and seal characteristics during the pressed sliding engagement with the face of the metal seal ring 49. It is to be understood, however, that any other suitable material having similar properties may be used.

The frictional drive for the rotating carbon seal ring 59 through the resilient ring 60 and cup 61 has been found desirable due to the fragility of the carbon ring which will chip or crack if driven directly by the shaft.

Inasmuch as some liquid fuel or vapor may leak from the chamber in the well which is adjacent the impeller to the chamber adjacent the motor, even with the provision of an efficient seal construction such as 48, it is necessary to provide a drain for such material. As best shown in Figures 2 and 4, the casing 17 has circumferentially spaced web portions 65 extending between the pump chamber defining portion and raised portions 66 on the enlarged casing head 37. These raised portions provide drain passageways 67 communicating with the well 47 below the shoulder 50 and they slope outwardly to the periphery of the head 37. The passageways 67 are internally threaded at their outer ends for a purpose to be later described.

A flared flinger member 68 has a tubular end 69 tightly embracing the shaft 27 adjacent the shoulder 50 and an outwardly flared skirt 70 extending in a direction axially of the shaft away from the seal construction 48. Any liquid leaking from the pump end of the device through the seal 48 is peripherally urged by the flinger member 68 against the inner periphery in the well of the casing 36 where it drains through one or more of the drain openings 67.

A flame barrier construction 71, for preventing propagation of flame from the motor to the pump, is interposed in the well 47 between the flinger 68 and the anti-friction member 46.

This construction 71 includes a sleeve member 72 having one end 73 snugly engaging a portion of the shaft for rotation therewith. The end 74 of the sleeve 72 is axially recessed as at 75 adjacent the shaft. A second sleeve member 76 has one end of its outer periphery sized for snugly engaging the wall of the well 47. The opposite end of the sleeve 76 slopes inwardly toward the longitudinal axis of the shaft 27 to provide a frusto-conical surface 77 terminating in a cylindrical portion 78 which extends into the flared skirt portion 70 of the flinger member 78. The inner peripheral surface of the sleeve 76 is so shaped as to complementally enclose the entire outer periphery of the sleeve 72. A portion of the sleeve 76 extends into the recess 75 and includes therein a portion of the shaft 27 from the bottom of the recess to a point adjacent the restricted end 69 of the flinger member.

The inner periphery of the sleeve 76 is sized to embrace the sleeve 72 and a portion of the shaft 27 in spaced relation therefrom to define a tortuous conduit 79 therebetween.

The clearance space or conduit 79 serves the purpose of sealing flame propagation from within the electric driving motor to the well 47. It is well known that flame will not pass through tortuous openings of reduced size, the walls of which are composed of materials which readily absorb heat, and since it is intended to deliver gasoline as the fuel by the pump, it is necessary that the pump and seal portions be made explosion-proof. Furthermore, as the pump assembly of this invention is intended preferably for use on aircraft, it is desirable to hold the weight and size to a minimum, and consequently the labyrinth arrangement of the narrow clearance space 79 is provided for obtaining the required length of a flame trap within the shortest practical longitudinal length along the shaft 27.

It will be clear from the foregoing and from Figure 3, that any liquid fuel leaking past the seal construction 48 will be flung outwardly by the flinger member 68 and will drain over the sloping surface 77 into one of the outlets 67.

As the cylindrical portion 78 of the seal sleeve 76 extends upwardly into the flinger member, there will be no liquid fuel leakage into the clearance space 79.

In order to further insure against possible explosion of gasoline vapor or liquid in the motor in the event the above described seal construction does not eliminate all passage of liquid gasoline or that gasoline vapor might be trapped in the flame barrier construction, an air circulating system is provided to sweep out all vapors and liquids beyond the seal 48 through a drain passage 67. Any fuel that leaks into the well 47, even though drains 67 are provided, will evaporate and some vapor might eventually find its way through the flame barrier defined by the clearance space 79. This vapor leakage would not only provide an explosion hazard but would dissolve the lubricant sealed in the anti-friction bearing 46 causing the bearing to eventually fail. This hazard is eliminated by providing a system for circulating air through the driving motor, the clearance space 79, and the well 47 to continuously scavenge the motor and the flame barrier construction.

To effect air circulation, the end housing 40 for the electric motor has a plug 80, with a porous core 81 preferably of compressed and sintered powdered metal therein. The plug 80 is threaded into a threaded opening 82 in the end housing 40 providing an air intake into the end of the motor remote from the pump construction.

As shown in Figures 1 and 4, with the pump assembly 10 mounted vertically along the axis A—A, a tube 83 is connected to one of the drain openings 67 by means of a threaded connector member 84. When the pump assembly is mounted horizontally along the axis B—B or angularly between the vertical and horizontal axes, the tube 83 is connected to the lowermost drain opening 67. The end 85 of the tube 83 extends into the stream of air which flows past the vehicle. In an aircraft installation, the end 85 is positioned in the slip stream to draw air out of the tube 83. The other drain openings 67 are plugged by plug members 86 so that suction through the tube 83 exhausts all fluid and liquid from the well 47. This exhaust not only drains liquid fuel which has leaked through the seal member 48 but also scavenges the vapor formed by the vaporized fuel and causes a flow of air through the intake plug 80 and entirely through the electric motor. This flow of air is further beneficial in that it effects a cooling of the motor. The air flow then passes by the anti-friction bearing 46 through the slot 46b and the clearance opening 79 into the well 47 where it is exhausted through the selected drain opening 67.

The porous material 81 used in the air intake plug 80 should be of such construction that its porosity permits fairly free flow of air into the casing 40 but prevents flames from propagating outwardly if an explosion takes place within the motor. While the intake plug 80 is preferably positioned in the end housing 40 in order that flow of air will pass entirely through the motor and a cooling effect will thereby be obtained, it is to be understood that the intake may be positioned anywhere along the length of the motor and even in one of the unused drain openings 67. In this manner, the well 47 is scavenged of all liquid and vapor fuel thereby eliminating any seepage into the flame barrier 71.

It will be apparent from the foregoing that I have provided a driven pump assembly in which the pump and motor portions thereof are effectively sealed against undue leakage of liquid fuel or fuel vapors therebetween; which is scavenged of any liquid fuel or fuel vapors seeping between the pump and motor portions; which is explosion-proof; and which provides an air-cooled driving motor construction.

While a particular embodiment only of this invention has been illustrated, it will, of course, be understood that the invention should not be limited thereto, since many modifications may be made, and therefore it is contemplated by the appended claims to cover all such modifications as fall within the true spirit and scope of the present invention.

I claim as my invention:

1. In a fuel system for a vehicle including a fuel tank, a pump for delivering fuel from said tank to a delivery line, a motor for driving said pump, and means for sealing said pump and motor against liquid leakage therebetween, the improvement of means defining an air flow path through said motor, and a drain device adapted to induce air flow through said path to sweep out any fuel which leaks past the seal means.

2. In a fuel system for a vehicle including a fuel tank, a pump for delivering fuel from said tank to a delivery line, a driving motor, a shaft driven by said motor for driving the pump, and means for sealing said shaft against leakage between the pump and the motor, the improvement of means defining an air flow path through the motor to a point adjacent the sealing means, and a drain device communicating with the sealing means and with the stream of air flowing past the vehicle during movement of the vehicle for inducing air flow through said path to sweep out any fuel which leaks beyond the seal means.

3. In a fuel system for a vehicle including a fuel pump, an electric motor spaced therefrom, a shaft well between the motor and pump, and a motor-driven pump shaft extending through said well in spaced relation therefrom, the improvements of spaced shaft seal and flame trap constructions in said well defining therebetween a localized well chamber, means defining an air flow path through said motor, and means connecting the localized well chamber with the air stream adjacent the vehicle to draw air through said air path and said flame trap for scavenging the well chamber.

4. In a pump and electric motor assembly for a vehicle including a housing defining a pump chamber, a motor chamber, and a shaft well therebetween connecting said chambers, the improvements of spaced pump seal and flame trap constructions in said well and defining therewith a localized well chamber, a drain outlet for said well chamber, an air inlet for said well chamber, and means for inducing air flow through the outlet to scavenge the well chamber.

5. In an aircraft fuel system including a fuel pump, a shaft for driving the pump, and a housing surrounding the shaft, the improvements of spaced shaft seal and barrier constructions in said housing defining therebetween a localized chamber in the housing, an air inlet to said chamber, and means connecting said chamber with the slip stream of the aircraft to draw air therefrom for scavenging the chamber.

6. In a fuel system for a vehicle having a fuel tank, a pump for delivering fuel from the tank to a delivery line, a driving motor, a pump shaft driven by said motor, a housing for said pump shaft and motor, and sealing means spaced longitudinally along said shaft between the shaft and housing defining a localized housing chamber therebetween, the improvements of a flinger on said shaft between said sealing means, means defining an air flow path through the motor and one of the sealing means into said chamber, said chamber having a plurality of outlets adjacent said flinger, and a suction line extending from one of said outlets into the stream of air flowing past the vehicle to exhaust fuel from the chamber and to draw air through the motor and said one sealing means.

7. In a pump and electric motor assembly including a pump shaft directly driven by said motor, the improvements of a housing for said assembly having a passageway between the motor and pump freely receiving said shaft therethrough, sealing means in said passageway comprising relatively rotating contacting sealing rings attached respectively to said shaft and to a wall of said passageway, relatively rotating spaced interfitting members attached respectively to said shaft and to a wall of said passageway on the motor side of the sealing rings defining therebetween a tortuous path sealing against flame propagation from the motor to the pump, a flinger member on said shaft between said sealing rings and said interfitting members, and a drain outlet communicating with the passageway adjacent the flinger.

8. In a pump and motor assembly, a shaft driven by the motor for driving the pump, a housing for said assembly having a reduced connecting passageway between the pump and motor freely accommodating said shaft, said passageway having an internal shoulder, a stationary seal ring seated snugly on said shoulder and disposed freely around said shaft, a seal ring rotatable with said shaft in slidable engagement with said stationary seal ring, means urging said rotatable seal ring against said stationary seal ring, a flinger member on said shaft positioned between the seal rings and motor, a second stationary seal member seated in said passageway between said flinger member and the motor, and a second rotatable seal member on said shaft within said second stationary seal member, said seal members having their adjacent surfaces in spaced relation defining a tortuous narrow path from the motor to said pasageway, said housing having a drain therein communicating with said passageway, and means extending from said drain to remove any fluid thrown thereinto by said flinger or passing through said narrow path from the motor.

9. In a pump and motor assembly including a shaft driven by said motor for rotating a pump impeller carried on the shaft, the improvements of a housing surrounding said shaft and having a shoulder on the inner periphery thereof, a seal ring loosely embracing said shaft and seated on said shouder, said seal ring having a reduced peripheral margin defining a slot between the body of said seal ring and the inner periphery of said housing, a resilient gasket seated in said slot, a seal nut threaded into said housing against said gasket for expanding the latter in said slot and maintaining the seal ring on said shoulder, a second seal ring on said shaft in slidable face engagement with said first seal ring, a resilient member frictionally engaging said second seal ring, a seal cup for said resilient member, lug and slot means connecting said cup and said impeller for co-rotation, and coil spring means between said seal cup and the pump impeller for maintaining said seal rings in tight sliding face engagement whereby the ends of said housing are sealed against liquid leakage therebetween.

10. In a pump and motor assembly, a shaft driven by the motor for driving the pump of said assembly, a housing surrounding said shaft, a combined air flow conduit and flame trap in said housing between the pump and motor comprising a sleeve member sealingly engaging said shaft, and a second sleeve member sealingly engaging the inner periphery of said housing and embracing said first sleeve member in spaced relation therefrom, said members being mounted for relative rotation, and the space between said members defining a narrow tortuous path of greater length than the length of said sleeve members.

11. In a pump and motor assembly, a shaft driven by the motor for driving the pump of said assembly, a housing surrounding said shaft, a combined fluid conduit and flame trap in said housing between the pump and motor comprising a sleeve having a portion sealingly engaging the periphery of said shaft and an axial recessed portion spaced from said shaft, and a second sleeve having a portion sealingly engaging the inner periphery of said housing and a conical portion sloping toward the axis of said shaft, said sleeves being mounted for relative rotation, the inner periphery of said second sleeve being shaped to embrace said first sleeve and a portion of said shaft in spaced relation therefrom, the space between said members defining a tortuous path of greater length than the length of said sleeve members.

12. In a pump and motor assembly, a pump shaft driven by the motor for driving the pump of said assembly, a housing surrounding said shaft, a combined trap and gas conduit in said housing between the pump and motor comprising a sleeve having a portion at one end tightly embracing said shaft and an axially extending inner recess at the other end thereof, a second sleeve having one end snugly engaging the inner periphery of said housing and its other end tapering away from said one end toward the axis of said shaft, the inner periphery of said second sleeve being complementally shaped to embrace the entire periphery of said first sleeve and a portion of said shaft in spaced relation therefrom to define a tortuous path, a flared flinger member tightly embracing said shaft for rotation thereby and having a portion overlapping the tapered end of said second sleeve, and an outlet in said housing adjacent the base of said tapered portion on said second sleeve, said outlet exhausting any liquid thrown by said flinger between the tapered base of said second sleeve and said housing and any gas drawn through said space between the sleeves.

13. In a fuel system including a fluid pump, the improvements of a prime mover for said pump, a seal construction for sealing said prime mover against fluid leakage from the pump, and a trap construction for scaling said prime mover against flame propagation to the pump.

14. In a pump and motor assembly including a pump shaft driven by said motor and a housing providing a passageway between the motor and pump freely receiving said shaft, the improvement of a flame trap between the pump and motor comprising a first sleeve member in said passageway snugly engaging a portion of said shaft and rotatable with the shaft, a second sleeve member in said passageway disposed around the first sleeve member and snugly engaging a wall of the housing, and said sleeve members cooperating to define a narrow elongated tortuous path sealing the pump and motor against flame propagation therebetween.

15. In a pump and motor assembly including a pump shaft driven by said motor and a housing providing a passageway between the motor and pump freely receiving said shaft, the improvement of a flame trap between the pump and motor comprising relatively rotating spaced interfitting parts in said passageway carried by said shaft and housing respectively defining therebetween a narrow path sealing against flame propagation between the motor and pump.

RUSSELL R. CURTIS.